June 13, 1950     J. W. DICKEY     2,511,698
ELECTRICAL TRANSMISSION SYSTEM
FOR SPEEDOMETERS AND THE LIKE
Filed May 31, 1946     2 Sheets-Sheet 2
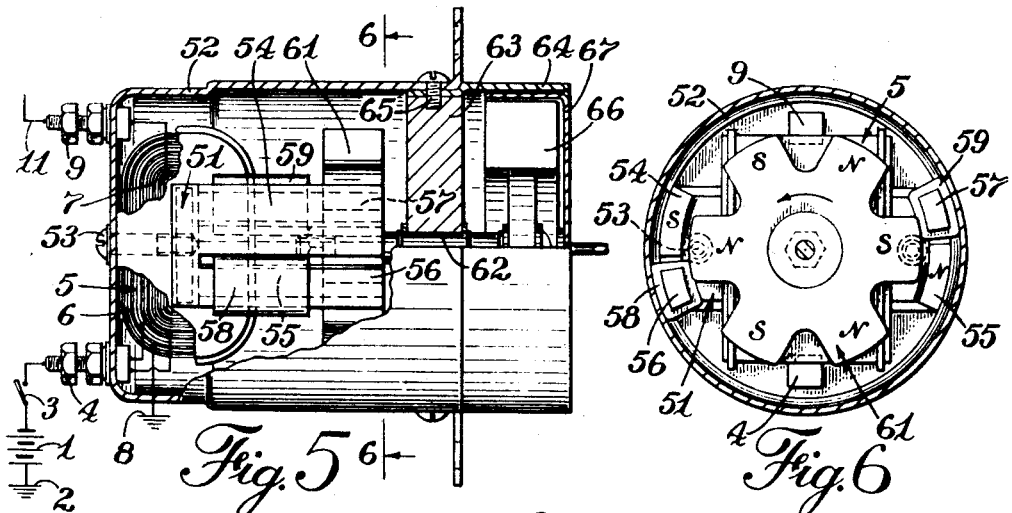
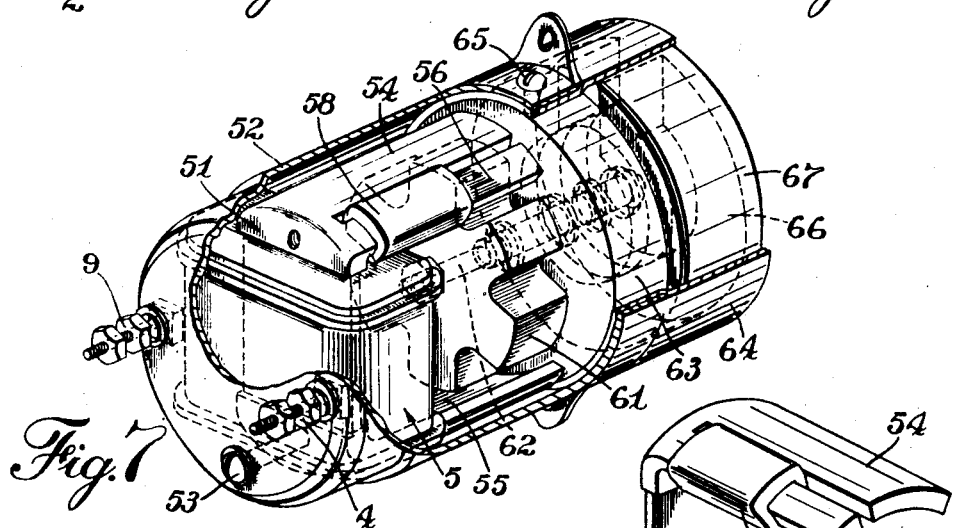
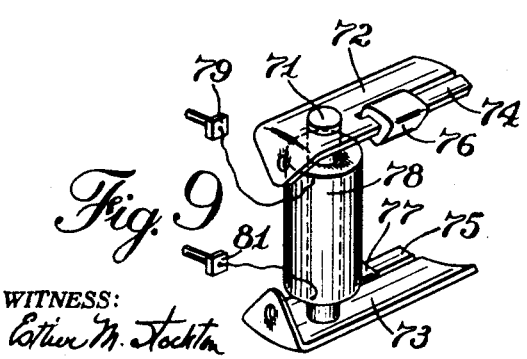
INVENTOR.
John W. Dickey
BY
ATTORNEY
WITNESS:

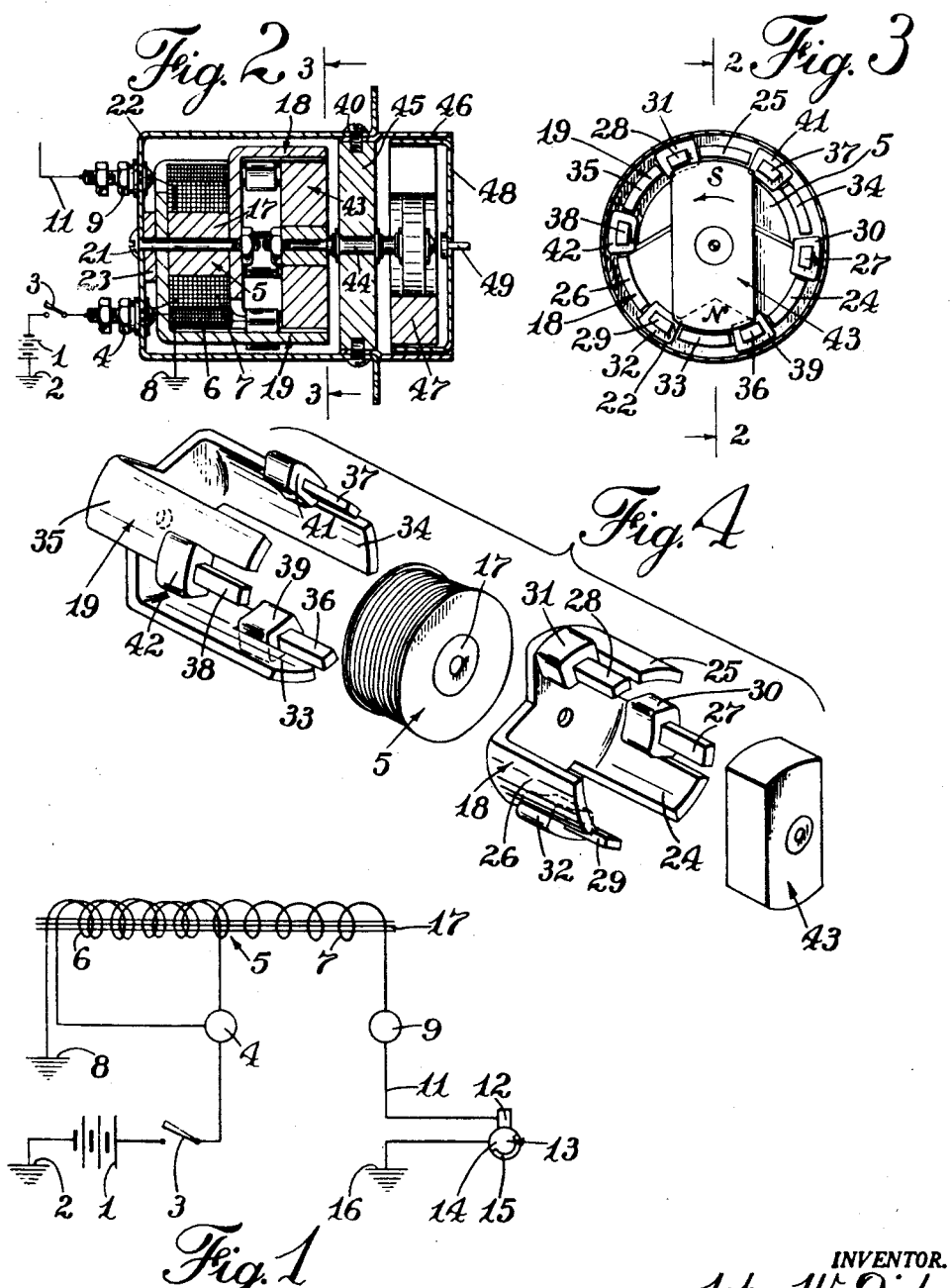

Patented June 13, 1950

2,511,698

UNITED STATES PATENT OFFICE 2,511,698

ELECTRICAL TRANSMISSION SYSTEM FOR SPEEDOMETERS AND THE LIKE

John W. Dickey, Newfield, N. Y., assignor to Bendix Aviation Corporation, Elmira Heights, N. Y., a corporation of Delaware Application May 31, 1946, Serial No. 673,386

2 Claims. (Cl. 318—27)

The present invention relates to an electrical transmission system and more particularly to a system for rotating electrically a driven element such as the rotor of a speedometer in timed relation with a driving element such as a wheel or axle of an automobile.

It is an object of the present invention to provide a novel transmission of the above character which is efficient and reliable in operation while being simple and economical in construction.

It is another object to provide such a device which utilizes as its source of power the electrical battery of the vehicle so equipped.

It is another object to provide such a device which is arranged to operate the recording device such as the speedometer mechanism equally well whether the vehicle is moving forward or backward.

It is a further object to provide such a device which eliminates the necessity for complicated reduction gears.

It is a further object to provide an electrical drive for speedometers or the like which is operated by pulsating direct current.

It is another object to provide such a device in which the pulsations of direct current are controlled by the rotation of a driving element such as the vehicle wheel.

It is a further object to provide such a device incorporating means for rotating a driven element through a predetermined part of a revolution in response to each pulsation of the current.

Further objects and advantages will be apparent from the following description taken in connection with the accompanying drawing, in which:

Fig. 1 is a diagrammatic representation of an electrical system embodying a preferred form of the present invention;

Fig. 2 is a sectional view of one form of applicant's novel electrical driving mechanism;

Fig. 3 is a section taken substantially on the line 3—3 of Fig. 2;

Fig. 4 is a detail in perspective of the rotor and stator elements of the electrical driving means shown in disassembled relation;

Fig. 5 is a side elevation, partly broken away and in section, of another embodiment of applicant's electrical driving mechanism;

Fig. 6 is a section taken substantially on the line 6—6 of Fig. 5;

Fig. 7 is a perspective partly broken away and in section of the structure illustrated in Fig. 5;

Fig. 8 is a detail in perspective of the core and pole member of the electromagnet illustrated in Fig. 5; and Fig. 9 is a detail in perspective of another embodiment of applicant's driving mechanism.

In Fig. 1 of the drawing, there is illustrated an electrical system comprising a battery 1 grounded at 2 and connected by a manual switch 3 to the terminal 4 of an electromagnet indicated generally by numeral 5. The electromagnet 5 is provided with two windings 6 and 7 respectively. One end of the winding 6 is connected to the terminal 4 and the other end is grounded at 8. One end of the winding 7 is also connected to the terminal 4 and the other end of this winding is connected to a second terminal 9. A lead 11 extends from terminal 9 to a contact device comprising a brush 12 and a rotating contactor 13 mounted on any suitable element of the vehicle which rotates when the vehicle moves, such as one of the wheels or axles. Contactor 13 has a conductive portion 14 and an insulating portion 15, the conductive portion 14 being grounded as indicated at 16 in order to complete the circuit of the winding 7 of the electromagnet.

The windings 6 and 7 of the electromagnet are oppositely polarized. That is, when energized, they produce flux through the core 17 of the electromagnet in opposite directions. The winding 7 is so designed as to be substantially more effective than the winding 6 and preferably provides twice as many ampere turns as the winding 6. When the winding 6 alone is energized, therefore, the electromagnet 5 will be energized with a corresponding polarity, while when both coils are energized the winding 7 reverses the polarity of the electromagnet.

In Figs. 2, 3 and 4 of the drawing, there is illustrated a rotor mechanism which utilizes the reversal of flux of electromagnet 5 to rotate a driven member which may be the recording member of a speedometer head or the like. As there shown, the electromagnet 5 with its core 17 is provided with pole members 18 and 19 which are clamped thereto by means of a bolt 21 which axially traverses the electromagnet and pole members, and rigidly connects them to a casing 22 of non-magnetic material, preferably with the interposition of a non-magnetic spacer 23.

The pole member 18 is provided with three spaced poles 24, 25 and 26 extending axially therefrom. Each of these poles is slotted to provide separate sections 27, 28 and 29 respectively, and slugs 30, 31, 32 of highly conductive material such as copper are mounted on said sections so as to "shade" the poles by retarding the changes in flux through said sections.

The pole piece 19 is similarly provided with three poles 33, 34 and 35 which extend around the electromagnet 5 and terminate in the same plane as the poles 24, 25, 26 of pole member 18, being intercalated therebetween as best shown in Fig. 3. The poles 33, 34 and 35 have sections 36, 37 and 38 which are shaded by copper slugs 39, 41, 42 similarly to the poles of the pole piece 18.

A permanent magnet 43 is fixedly mounted in any suitable manner on a drive shaft 44 rotating in bearing member 45 in the frame member 46 of a speedometer head to which the casing 22 is suitably attached as by means of cap screws 40. The shaft 44 is so positioned as to locate the rotor magnet 43 between the poles of the pole members 18, 19 with a suitable running clearance as best shown in Fig. 2. A permanent magnet 47 is fixedly mounted on the shaft 44 for actuation of a cup-shaped driven member 48 of aluminum or other suitable conductive material which in turn actuates the speedometer needle shaft 49 in the conventional manner.

Terminals 4 and 9 are mounted in the bottom of the casing 22, insulated therefrom, and are connected as indicated to the coils 6 and 7 of the electromagnet.

In operation, closure of the manual switch 3, which is preferably the ignition switch of the vehicle, causes the winding 6 of electromagnet 5 to be continuously energized, thus causing flux to flow through the core 17 of the electromagnet. This flux is conducted through the pole members 18, 19 so that, for instance, the poles 24, 25, 26 of pole member 18 may be north poles while the poles 33, 34, 35 of pole member 19 are south poles. This will cause the permanent magnet 43 to rotate until its north pole is in registry with the nearest pole of the pole member 19 while its south pole will at the same time come into registry with the opposite pole of pole member 18. Fig. 3 shows such a situation in which the north pole of rotor magnet 43 is in registry with the pole 33 of pole member 19, and the south pole of the rotor magnet is in registry with the pole 25 of pole member 18.

If, now, the contactor 13 rotates until the brush member 12 is grounded through the conducting segment 14 as shown in Fig. 1, then the winding 7 of the electromagnet 5 is energized and the polarity of the electromagnet is reversed. Pole 33 of pole member 19 now becomes a north pole, while pole 25 of pole member 18 becomes a south pole. The like poles of the magnetic rotor 43 are accordingly repulsed thereby, and since the reversal of flux in the sections 36 and 28 of said poles respectively is delayed by the shading coils 39, 31, this repulsion is unsymmetrical with respect to the rotor and causes it to rotate counterclockwise as viewed in Fig. 3. At the same time, the adjacent pole 35 has become a north pole while the opposite pole 24 has become a south pole so that they attract and further rotate the rotor 43 until its south and north poles are respectively in registry therewith. The closure of the contacts 12, 14 thus causes the rotor to turn through a sixth of a revolution.

When the contactor 13 rotates further so as to break the circuit of the winding 7 through the electromagnet, the polarity of the electromagnet is again reversed, causing a further rotation of the rotor 43 through an angle of 60°. The rotor 43 is thus caused to revolve in timed relation with the rotation of the contactor 13, the rotor turning at one-third the speed of the contactor.

It will be appreciated that this device may be used as an engine tachometer and for many other purposes where it is desired to rotate at a distance a driven element in timed relation with an element whose movement and/or speed is to be recorded. It is particularly advantageous for automobile use since it is merely necessary to run a single wire from the battery to the motive device and another wire from the motive device to the contactor. Moreover, since the contactor may conveniently be mounted on the wheel or axle, it is not necessary to have the great variety of reduction gears needed to accommodate the various differential gear ratios in connecting conventional types of speedometers to the various vehicle transmission shafts.

In Figs. 5 to 8 of the drawing, there is illustrated an embodiment of the invention employing a simplified two-pole electromagnetic structure, with a multipolar permanent magnet actuator. As there shown, the electromagnet 5 is provided with a U-shaped core and pole member 51 which is retained in a cylindrical casing 52 of non-magnetic material by means of mounting screws 53. The poles 54 and 55 of the core member 51 are formed with a cylindrical contour, and portions 56 and 57 thereof are separated and surrounded by shading slugs 58, 59 of conductive material such as copper for retarding the reversals of flux.

A multipolar permanent magnetic rotor 61 is fixedly mounted on a shaft 62 journalled in a bearing member 63, the bearing member being arranged to locate the rotor between the poles of the core member 51 with suitable clearance. The bearing member 63 is mounted in the casing 64 of the speedometer head, being retained by screws 65 which also serve to attach the casing 52 to the speedometer head.

Shaft 62 carries a second permanent electromagnetic rotor 66 arranged to actuate the speedometer needle driving member 67 in the usual manner. Casing 64 is preferably formed of suitable magnetic material such as wrought iron in order to serve effectively as the return path for the flux of the magnet 66.

Terminals 4 and 9 are mounted in the casing 52 as indicated and are connected to the windings of the electromagnet 5 as previously described.

The permanent magnet 61 is here shown as having six poles which occur in alternation as indicated in Fig. 6. Reversals of flux in the electromagnet 5 accordingly cause rotation of the permanent magnet in a counterclockwise direction as shown in Fig. 6. Thus, assuming that at any particular time electromagnet 5 is so energized that its pole 54 is a south pole while 55 is a north pole, these poles will attract the adjacent poles of opposite polarity of the permanent magnet as shown in Fig. 6. If now the polarity of the electromagnet is reversed by energization or deenergization of winding 7 thereof due to rotation of the axle of the vehicle, the portions 56 and 57 of the poles of the electromagnet will retain their polarity for a brief period of time due to the shading effect of the slugs 59 located thereon. The permanent magnet 63 will then be rotated counterclockwise by the attraction of the portions 56, 57 and by the repulsion of the portions 54, 55 which are now of like polarity. The next set of poles of the permanent magnet are thus brought into proximity to the electromagnetic poles 54, 55 and since they are oppositely polarized, they will be attracted thereby and will rotate into registry therewith, until the next reversal of polarity of the electromagnet.

It will be noted that in the operation of the present invention the speedometer mechanism will be actuated in the same direction whether the vehicle is moving forward or backward so that the actual total mileage of the vehicle will be recorded irrespective of its direction of operation. This is particularly advantageous in connection with various types of commercial automotive, tractor and road-work equipment, which are frequently called upon to run backward a substantial part of the time.

In Fig. 9 of the drawing, there is illustrated a form of electromagnetic actuator employing a single magnet coil in conjunction with a permanent magnet to secure the necessary reversals of flux. As there shown, a permanent bar magnet 71 formed of material having a high coercive force is provided with a pair of pole pieces 72, 73 having sections 74, 75 which are shaded by means of slugs 76, 77. An electromagnetic coil 78 is mounted on an intermediate portion of the permanent magnet 71 and is provided with terminals 79, 81 corresponding to the terminals 4 and 9 of Fig. 1. In this case, however, the coil 78 is a single coil which is polarized reversely to the polarity of the permanent magnet 71. Coil 78 is so designed that when energized it will overcome the effect of the permanent magnet 71 and reverse the polarity of the pole pieces 72, 73 but when the coil is deenergized, the permanent magnet 71 resumes control of the pole pieces thereby again reversing the polarity thereof. It will be understood that since the magnet 71 is made of material having a high coercive force, the coil 78 may thus overcome the effect of the magnet without its impairing the effectiveness of the permanent magnet as soon as the coil 78 is deenergized.

The operation of this form of electromagnetic actuator is precisely the same as that illustrated in Figs. 5 to 8 inclusive, with the exception that since the coil 78 is a single untapped coil, there is no current drain from the battery except during the times that the contacts 12, 15 are closed.

What is claimed is:

1. An electrical speedometer drive for motor vehicles including an electro-magnet comprising two windings of opposite polarity, a pair of magnetic pole members clamped to the ends of the electro-magnet having poles extending laterally therefrom, said poles being divided into major and minor portions, the minor portions having rings of electrically conductive material mounted thereon; a rotor comprising a permanent magnet mounted to rotate in the field between said poles, means for constantly energizing one of said windings, means responsive to rotation of a moving part of the vehicle for intermittently energizing the other winding to thereby reverse the polarity of the electro-magnet and means for transmitting the consequent rotation of the permanent magnet to a recording device.

2. In an electrical speedometer for motor vehicles a skeleton cup-shaped pole member of magnetic material having a plurality of circularly arranged poles, an electro-magnet seated therein, a second similarly shaped pole member nested in the first pole member in engagement with the electro-magnet and with its poles intercalated between those of the first pole member, said electro-magnet having a core normally magnetized with its opposite poles engaging said pole members, said electro-magnet further comprising a coil which when energized reverses the polarity of the core; means responsive to rotation of a moving part of the vehicle for intermittently energizing said winding, a permanent magnet rotatably mounted adjacent the poles of the pole members, and means for transmitting rotation of the permanent magnet to a recording device.

JOHN W. DICKEY.

REFERENCES CITED

The following references are of record in the file of this patent:

UNITED STATES PATENTS

| Number | Name | Date |
| --- | --- | --- |
| 1,371,096 | Howe et al. | Mar. 8, 1921 |
| 1,933,591 | Holtz et al. | Nov. 7, 1933 |
| 1,957,275 | Lenehan | May 1, 1934 |

FOREIGN PATENTS

| Number | Country | Date |
| --- | --- | --- |
| 447,080 | Great Britain | May 12, 1936 |